United States Patent [19]

Kuo

[11] Patent Number: 5,629,385

[45] Date of Patent: May 13, 1997

[54] ALLYLAMINE COPOLYMERS HAVING PHOSPHONIC, CARBOXYLIC OR SULFONIC GROUPS AND N-OXIDE DERIVATIVES THEREOF

[75] Inventor: Lawrence L. Kuo, Columbia, Md.

[73] Assignee: BetzDearborn Inc., Trevose, Pa.

[21] Appl. No.: 344,191

[22] Filed: Nov. 23, 1994

[51] Int. Cl.$^6$ ........................................ C08L 23/32
[52] U.S. Cl. .................. 525/328.2; 525/340; 525/353; 252/180; 510/247; 210/700
[58] Field of Search .................. 252/80, 82, 175, 252/180; 525/328.2, 340, 353; 526/278, 287; 510/247

[56] References Cited

U.S. PATENT DOCUMENTS

| | | | |
|---|---|---|---|
| 2,752,221 | 6/1956 | Wachter et al. . | |
| 4,051,110 | 9/1977 | Quinlan | 260/72 R |
| 4,080,375 | 3/1978 | Quinlan | 260/502.5 |
| 4,085,134 | 4/1978 | Redmore et al. | 260/502.5 |
| 4,128,538 | 12/1978 | Burness et al. | 525/328.2 |
| 4,212,734 | 7/1980 | Redmore et al. | 210/58 |
| 4,253,886 | 3/1981 | Aonuma et al. | 148/105 |
| 4,329,441 | 5/1982 | Bergthaller | 526/288 |
| 4,504,640 | 3/1985 | Harada et al. | 526/193 |
| 4,525,293 | 6/1985 | Kisil et al. | 252/181 |
| 4,528,347 | 7/1985 | Harada et al. | 526/219 |
| 4,540,760 | 9/1985 | Harada et al. | 526/211 |
| 4,604,451 | 8/1986 | Harada et al. | 525/328.2 |
| 4,626,577 | 12/1986 | Harada | 525/369 |
| 4,661,263 | 4/1987 | Roark | 210/735 |
| 4,687,817 | 8/1987 | Harada et al. | 525/375 |
| 4,711,725 | 12/1987 | Amick et al. | 252/180 |
| 4,778,725 | 10/1988 | Serizawa et al. | 525/328.2 |
| 4,898,684 | 2/1990 | Chen et al. | 252/180 |
| 4,927,896 | 5/1990 | Blocker et al. | 526/93 |
| 5,122,278 | 6/1992 | Longworth et al. | 252/180 |
| 5,260,385 | 11/1993 | Iio | 525/328.2 |
| 5,322,636 | 6/1994 | Schaper | 252/82 |
| 5,395,896 | 3/1995 | Moriya et al. | 525/328.2 |

FOREIGN PATENT DOCUMENTS

| | | | |
|---|---|---|---|
| 3197690 | 8/1991 | Japan | C23F 11/14 |
| 5302288 | 11/1993 | Japan . | |
| 5302289 | 11/1993 | Japan . | |
| 2165228 | 4/1986 | United Kingdom | C02F 5/12 |
| 9102011 | 2/1991 | WIPO | C08F 8/40 |
| 9401477 | 1/1994 | WIPO . | |

*Primary Examiner*—Prince Willis, Jr.
*Assistant Examiner*—Cephia D. Toomer
*Attorney, Agent, or Firm*—Alexander D. Ricci; Philip H. Von Neida

[57] ABSTRACT

This invention is directed to certain novel N-functionalized polyallylamines having recurring units represented by the formula:

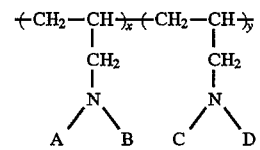

wherein A, B, C and D are independently selected from the group consisting of hydrogen, $CH_2PO_3H_2$, $(CH_2)_n COOH$, $(CH_2)_m SO_3H$ and water-soluble salts thereof, wherein n=1 to 4, m=1 to 4, X is 1 to 99 mol %, Y is 1 to 99 mol % and X+Y=100 and with the proviso that when A is hydrogen, B is $(CH_2)_n COOH$, or $(CH_2)_m SO_3H$ and at least one of C and D is $CH_2PO_3H_2$ or $(CH_2)_m SO_3H$, when A is $(CH_2)_n COOH$, at least one of B, C and D is $CH_2PO_3H_2$ or $(CH_2)_m SO_3H$ and when A is $CH_2PO_3H_2$, at least one of B, C or D is $(CH_2)_n COOH$ or $(CH_2)_m SO_3H$. The compositions of this invention are useful in water treatment to inhibit or remove scale deposits.

6 Claims, No Drawings

ALLYLAMINE COPOLYMERS HAVING PHOSPHONIC, CARBOXYLIC OR SULFONIC GROUPS AND N-OXIDE DERIVATIVES THEREOF

FIELD OF THE INVENTION

This invention relates to novel water-soluble N-functionalized polyallylamines and to a method of using these polyallylamines for controlling or preventing scale on surfaces which are in contact with aqueous systems.

BACKGROUND OF THE INVENTION

Most industrial aqueous systems contain dissolved alkaline earth and transition metal cations such as calcium, magnesium, iron and the like, as well as various anions such as bicarbonate, carbonate, sulfate, and the like. When the concentration of the various combinations of these cations and anions exceeds the solubility of their reaction products, these reaction products will tend to precipitate out of solution until their product solubility concentrations are no longer exceeded. The deposits formed by the precipitation of these reaction products onto the surfaces of industrial aqueous systems is known as scale.

The precipitation of calcium carbonate is by far the most common form of scale in industrial aqueous systems. This occurs when the ionic product of calcium and carbonate exceeds the solubility of calcium carbonate, and a solid phase of calcium carbonate forms.

The formation of scale in industrial aqueous systems represents a major problem since it reduces heat transfer efficiency on heat exchange surfaces, induces or leads to increased corrosion in the system and reduces flow of the water through the system. The addition of inorganic phosphates, and more recently organic polymers, such as polyacrylates, to aqueous systems is known to prevent or inhibit scale formation. However, not all polymers have been effective for scale inhibition.

In general, the problem of the prior art polymeric scale inhibitors involves solubility and/or the ability to form strong complexes with scale forming salts. The present invention is directed to certain novel N-functionalized polyallylamines which can be tailored to control both complexation and solubility.

SUMMARY OF THE INVENTION

It is an object of this invention to provide novel, water-soluble N-functionalized polyallylamines.

It is another object of this invention to provide a method for inhibiting scale on surfaces in contact with aqueous systems.

In accordance with the present invention there have been provided certain novel water-soluble N-functionalized polyallylamines having recurring units of the formula:

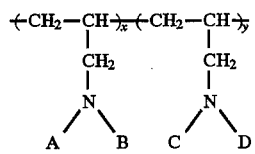

wherein A, B, C and D are independently selected from the group consisting of hydrogen, $CH_2PO_3H_2$, $(CH_2)_n COOH$, $(CH_2)_m SO_3H$ and water-soluble salts thereof, wherein $n=1$ to 4, $m=1$ to 4, X is 1 to 99 mol %, Y is 1 to 99 mol % and $X+Y=100$ and with the proviso that when A is hydrogen, B is $(CH_2)_n COOH$, or $(CH_2)_m SO_3H$ and at least one of C and D is $CH_2PO_3H_2$ or $(CH_2)_m SO_3H$, when A is $(CH_2)_n COOH$, at least one of B, C and D is $CH_2PO_3H_2$ or $(CH_2)_m SO_3H$ and when A is $CH_2PO_3H_2$, at least one of B, C or D is $(CH_2)_n COOH$ or $(CH_2)_m SO_3H$.

Also in accordance with the present invention, there has been provided a method for preventing or controlling scale deposits on surfaces in contact with an aqueous system comprising adding to the system a scale inhibiting amount of a water-soluble N-functionalized polyallylamine having recurring units of the formula:

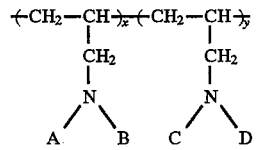

wherein A, B, C and D are independently selected from the group consisting of hydrogen, $CH_2PO_3H_2$, $(CH_2)_n COOH$, $(CH_2)_m SO_3H$ and water-soluble salts thereof, wherein $n=1$ to 4, $m=1$ to 4, X is 1 to 99 mol %, Y is 1 to 99 mol % and $X+Y=100$ and with the proviso that when A is hydrogen, B is $(CH_2)_n COOH$, or $(CH_2)_m SO_3H$ and at least one of C and D is $CH_2PO_3H_2$ or $(CH_2)_m SO_3H$, when A is $(CH_2)_n COOH$, at least one of B, C and D is $CH_2PO_3H_2$ or $(CH_2)_m SO_3H$ and when A is $CH_2PO_3H_2$, at least one of B, C or D is $(CH_2)_n COOH$ or $(CH_2)_m SO_3H$.

DETAILED DESCRIPTION

The present invention is directed to certain novel water-soluble, N-functionalized polyallylamines having recurring units represented by the formula:

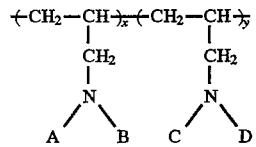

wherein A, B, C and D are independently selected from the group consisting of hydrogen, $CH_2PO_3H_2$, $(CH_2)_n COOH$, $(CH_2)_m SO_3H$ and water-soluble salts thereof, wherein $n=1$ to 4, $m=1$ to 4, X is 1 to 99 mol %, Y is 1 to 99 mol % and $X+Y=100$ and with the proviso that when A is hydrogen, B is $(CH_2)_n COOH$, or $(CH_2)_m SO_3H$ and at least one of C and D is $CH_2PO_3H_2$ or $(CH_2)_m SO_3H$, when A is $(CH_2)_n COOH$, at least one of B, C and D is $CH_2PO_3H_2$ or $(CH_2)_m SO_3H$ and when A is $CH_2PO_3H_2$, at least one of B, C or D is $(CH_2)_n COOH$ or $(CH_2)_m SO_3H$. The molecular weight of the N-functionalized polyallylamines of this invention is not, per se critical to the invention provided, of course, that the final polymer is water soluble. In general, the molecular weight of the polyallylamine is generally in the range of from 800 to 100,000, preferably from 800 to 50,000 and most preferably from 900 to 10,000.

The N-functionalized polyallylamines of this invention may be prepared by dissolving a low molecular weight, i.e. having a molecular weight in the range 700 to 100,000, primary or secondary polyallylamine, preferably a low molecular weight hydrohalogenated polyallylamine, in a concentrated acid, typically hydrochloric acid, and then adding phosphorous acid to this reaction mixture. This solution is then heated to reflux with the subsequent addition of an aldehyde or an aldehyde containing or aldehyde-generating compound. The resultant polymer is a phosphonalkylated derivative of polyallylamine. A preferred aldehyde is formaldehyde. The formaldehyde is generally in the form of a 37% active formaldehyde solution and is commercially available as formalin which is an aqueous solution of 37% formaldehyde which has been stabilized with from 6 to 15% methanol. Other commercial grades of formaldehyde and its polymers can also be used. Such commercial grades include 44, 45 and 50% low methanol formaldehyde, solutions of formaldehyde in methyl, propyl, n-butyl and isobutyl alcohol, paraformaldehyde, as well as its polymerized forms and trioxane.

Aldehyde-containing reactants include organic chemical compounds which contain at least one aldehyde group therein and include, for example, formaldehyde, acetaldehyde, propionaldehyde, glycolaldehyde, glyoxylic acid, and the like, or polyaldehydes, i.e. organic compounds having more than one aldehyde group in the compound, such as glyoxal, paraformaldehyde and the like. Suitable aldehyde-generating agents, i.e. organic compounds capable of forming an aldehyde group in situ, include melamine-formaldehyde monomeric products and derivatives such as tri- and hexa-(methylol)melamine and the tri- and hexa-($C_1$–$C_3$ alkoxymethyl) melamine. Such materials can be formed by known conventional methods.

The phosphonoalkylated derivative may then be further derivatized with halogenated $C_1$ to $C_4$ alkanoic acids, halogenated $C_1$ to $C_4$ alkanesulfonic acids or mixtures thereof. Suitable halogenated $C_1$ to $C_4$ alkanoic acids include, but are not limited to chloroacetic acid, chloropropanoic acid, chlorobutanoic acid and the like, or their water-soluble salts and mixtures thereof. Suitable halogenated alkanesulfonic acids include, but are not limited to 2-chloroethanesulfonic acid, chloromethane sulfonic acid, 2-chloropropanesulfonic acid, and the like or their water-soluble salts, and mixtures thereof. The N-functionalized polymers of this invention are prepared by refluxing the phosphonoalkylated derivative of polyallylamine under basic conditions, generally above pH 8, preferably greater than pH 9 in the presence of one or more of the above halogenated alkanoic acids, halogenated alkanesulfonic acids or mixtures thereof.

Alternatively, the N-functionalized polyallylamines of this invention may be prepared by directly derivatizing any primary or secondary polyallylamine with halogenated $C_1$ to $C_4$ alkanoic acids, halogenated $C_1$ to $C_4$ alkanesulfonic acids or mixtures thereof, as above described under the above basic conditions. The resultant polymers will of course have functional groups comprised of only carboxylic and/or sulfonic and, therefore, be substantially free of any phosphonic functional groups.

When preparing an N-functionalized polyallylamine polymer containing all three of the foregoing carboxylic, phosphonic and sulfonic functional groups, it is preferred to first derivatize a hydrohalogenated polyallylamine under acidic conditions to add the phosphonate functional groups, and then react this reaction product, under basic conditions, to add the carboxylic and sulfonic functional groups. It is of course well known that halogenated alkanesulfonic acids are slower reacting than halogenated alkanoic acids, and accordingly, the relative proportions of these reactants should be adjusted to account for these reaction kinetics and thereby achieve a final polymer having the desired relative proportions of sulfonic and carboxylic functional groups. One of ordinary skill in the art can readily determine an appropriate proportion to obtain the desired final polymer using conventional techniques. Accordingly, one of ordinary skill in the art, using the foregoing procedures, may readily prepare N-functionalized polyallylamine polymers having the desired proportions of phosphonic, carboxylic and sulfonic functional groups and thereby "tailor" the final polymer to achieve optimum performance in a particular aqueous environment.

In a preferred embodiment, the N-functionalized polyallylamine polymers of this invention are converted into the N-oxide form by the addition of a suitable oxidizing agent, such as e.g. hydrogen peroxide, under reflux conditions. The resultant N-oxide polymer has been found to provide enhanced stability in halogenated aqueous systems such as e.g. chlorinated systems. The N-oxide polymers of this invention can be represented by recurring units of the formula:

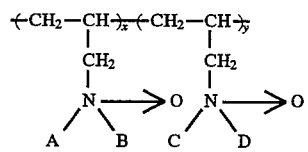

wherein A, B, C and D are independently selected from the group consisting of hydrogen, $CH_2PO_3H_2$, $(CH_2)_n$ COOH, $(CH_2)_m SO_3H$ and their water-soluble salts, wherein n=1 to 4, m=1 to 4, X is 1 to 99 mol %, Y is 1 to 99 mol % and X+Y=100.

The N-functionalized polyallylamines and N-oxide derivatives thereof of this invention are useful in treating aqueous systems, and are particularly useful for inhibiting or preventing the deposition of scale on surfaces of the aqueous systems. Typical scale deposit forming species found in aqueous systems include, but are not limited to calcium phosphate, calcium carbonate, calcium sulfate, calcium silicate, magnesium phosphate, magnesium sulfate, magnesium silicate, magnesium hydroxide, zinc hydroxide, iron oxide and the like, and mixtures thereof. It has now been discovered that the effectiveness of these polymers for scale complexation is directly proportional to the relative amounts of the particular functional groups in the following order of effectiveness: $CH_2PO_3H_2>(CH_2)_nCOOH>(CH_2)_mSO_3H$ wherein n and m are as above defined. However, it has also been discovered that the solubility of these polymers in aqueous systems is also directly proportional to the relative amounts of the functional groups in the following order: $(CH_2)_mSO_3H>(CH_2)_nCOOH>CH_2PO_3H_2$. Accordingly, it is an advantage of N-functionalized polyallylamines of the present invention that one of skill in the art may control the relative proportions of functional groups thereon, to specifically tailor the performance of the final polymer to achieve the desired degree of solubility and complexation effectiveness.

The preferred relative proportions for these functional groups in the final polymer are as follows: $CH_2PO_3H_2$: $(CH_2)_m$ $SO_3H$ in the range 90:10 to 40:60 mol % respectively, $(CH_2)_nCOOH:(CH_2)_m$ $SO_3H$ in the range 90:10 to 50:50 mol % respectively, $CH_2PO_3H_2:(CH_2)_nCOOH$ in the range 80:20 to 20:80 mol %, respectively, and $CH_2PO_3H_2:(CH_2)_nCOOH:(CH_2)_m$ $SO_3H$ in the range 40:40:20 to 20:20:40 mol %, respectively.

The aqueous systems which may be advantageously treated with the N-functionalized polyallylamines of this invention include, but are not limited to recirculating cooling water systems such as e.g. cooling towers, desalinization units, gas scrubbers, as well as boiler and steam condensate systems as well as other recirculating water systems where scale deposits are known to form. The present invention is particularly useful in the treatment of cooling water systems which operate at temperatures between 60° F. and 200° F., particularly open recirculating cooling water systems which operate at temperatures of from about 80° F. to 150° F.

The precise dosage of the scale inhibiting agents of this invention depends, to some extent, on the nature of the aqueous system in which it is to be incorporated and the degree of protection desired. In general, however, the concentration of N-functionalized polyallylamines maintained in the system can be from about 0.05 to about 10,000 ppm. Within this range, generally low dosages of about 500 ppm or less are preferred, with a dosage of about 100 ppm or less being most preferred for many aqueous systems, such as for example, many open recirculating cooling water systems. Typically dosages of about 0.5 ppm or more are preferred, with a dosage of about 2 ppm or more being most preferred. The exact amount required with respect to a particular aqueous system can be readily determined by one of ordinary skill in the art in conventional manners. As is typical of most aqueous systems, the pH is preferably maintained at 6.5 or above, and is most preferably maintained at 7.5 or above.

The scale inhibiting agents of this invention may be added to the system water by any convenient mode, such as by first forming a concentrated solution of the treating agent with water, preferably containing between 1 and 50 total weight percent of the N-functionalized polyallylamines, and then feeding the concentrated solution to the system water at some convenient point in the system. In many instances the treatment agent may be added to the make-up water or feed water lines through which water enters the system. For example, an injection calibrated to deliver a predetermined amount periodically or continuously to the make-up water may be employed.

It will be appreciated that while the compositions of this invention may be used as the sole scale inhibitor for the aqueous system, other conventional water treatment compositions customarily employed in aqueous systems may advantageously be used in combination with the claimed treatment agents. Thus, other suitable water treatment additives which may be used in combination with the N-functionalized polyallylamines of this invention which include, but are not limited to, biocides, other scale inhibitors, phosphonates, chelants, sequestering agents, dispersing agents, corrosion inhibitors, polymeric agents (e.g. copolymers of 2-acrylamido-2-methyl propane sulfonic acid and methacrylic acid or polymers of acrylic acid and methacrylic acid), and the like.

In a preferred embodiment, the polyallylamines and N-oxide derivatives thereof are added to the aqueous system in combination with phosphonates. This combination has been found to provide surprisingly enhanced scale inhibition. Examples of suitable phosphonates include, but are not limited to 1-hydroxyethylidene-1,1-diphosphonic acid, aminotrimethylphosphonic acid, 2-phosphonobutane-1,2,4-tricarboxylic acid and mixtures thereof. The relative amounts of polyallylamine:phosphonate can range from 1:0.01 to 1:1 on an active basis, preferably between 1:0.05 to 1:0.1.

The following examples are provided to illustrate the invention in accordance with the principles of this invention, but are not to be construed as limiting the invention in any way except as indicated in the appended claims. All parts and percentages are by weight unless otherwise indicated.

EXAMPLE 1

A 300 ml four-neck reaction flask was equipped with a condenser, a thermometer, a nitrogen gas inlet, and two syringes for the addition of initiator and chain transfer reagent. The flask was then charged with 56.1 g hydrochlorinated allylamine (AA.HCl), 50 g concentrated hydrochloric acid, 0.50 g of 2,2'-azobis(2-amidinopropane) dihydrochloride and 80 g deionized water. The flask was heated to 70° C. under a nitrogen atmosphere. 2.87 g of 2,2'-azobis (2-amidinopropane) dihydrochloride was dissolved in 20 g deionized water and transferred into a syringe. A solution of 6 g isopropanol and 9 g deionized water was transferred to another syringe. Both solutions were added simultaneously to the flask over a 15-hour period. After addition, the reaction was continued for an additional 7 hours at 70° C. The resulting solution of P(AA.HCl) was used for incorporation of functional groups.

EXAMPLE 2

To 66.0 g of P(AA.HCl) solution from Example 1 were added 30 g concentrated hydrochloric acid, 22 g phosphorous acid and 36 g of formalin. The solution was heated to reflux for 12 hours. After reaction, the excess HCl was removed by evaporation and the solution was neutralized with aqueous sodium hydroxide to be 180 g and pH 10. 60 g of this alkaline solution was ultrafiltered through a 1000 molecular weight cut off membrane, concentrated and freeze-dried, giving 6.0 g white powder.

$^1$H and $^{31}$P NMR measurements indicated a partially phosphonomethylated polymer with 64 mol % $CH_2PO_3H_2$ functional group on a molar basis.

EXAMPLE 3

To 120 g of the unpurified, alkaline solution of the partially phosphonomethylated polymer from Example 2 was added 15.6 of sodium 2-chloroethanesulfonate, monohydrate. The solution was then heated to reflux for 24 hours. After reaction, the polymer was purified by ultrafiltration through a 1000 molecular weight cut off membrane, followed by concentration and lyophilization, yielding 12.3 g yellowish powder.

The structure of this material was verified by elemental analysis, $^1$H and $^{31}$P NMR as phosphonated/sulfonated polymer with 64 mol % $CH_2PO_3H_2$ and 21 mol % $CH_2CH_2SO_3H$ functional groups. The weight-average ($\overline{Mw}$) and number-average ($\overline{Mn}$) molecular weights were 15,800 and 6,300, respectively, as determined by gel permeation chromatography (GPC).

EXAMPLE 4

To 55.0 g of P(AA.HCl) solution from Example 1 were added 25 g concentrated hydrochloric acid, 15.0 g phosphorous acid and 27.0 g formalin. The solution was heated to reflux for 12 hours. After reaction, the excess HCl was removed by evaporation and the solution was neutralized with aqueous sodium hydroxide to be 150 g and pH 10. 50 g of this solution was ultrafiltered to remove low molecular weight (<1000) species, concentrated and freeze-dried, to give 4.8 g white powder.

$^1$H and $^{31}$P NMR measurements indicated a partially phosphonomethylated polymer with 53 mol % $CH_2PO_3H_2$ functional group.

EXAMPLE 5

To 100 g of the unpurified, alkaline solution of the partially phosphonomethylated polymer from Example 4 was added 18.5 g of monohydrated sodium 2-chloroethanesulfonate. After the solution was heated to reflux for 24 hours, the resulting polymer was purified and isolated by ultrafiltration and lyophilization, yielding 10.8 g yellowish powder.

The structure of this material was verified by elemental analysis, $^1$H and $^{31}$P NMR as phosphonated/sulfonated polymer with 53 mol % $CH_2PO_3H_2$ and 33 mol % $CH_2CH_2SO_3H$ functional groups. The $\overline{M}w$ and $\overline{M}n$ determined by GPC were 15,000 and 6,600, respectively.

EXAMPLE 6

To 44.0 g of P(AA.HCl) solution from Example 1 were added 20 g concentrated hydrochloric acid, 10.0 g phosphorous acid and 20.0 g formalin. The solution was heated to reflux for 12 hours. After removal of excess HCl by evaporation, the solution was neutralized with aqueous sodium hydroxide to be 120 g and pH 10. 40 g of this alkaline solution was ultrafiltered, concentrated and finally freeze-dried to give 3.9 g white powder.

$^1$H and $^{31}$P NMR measurements indicated a partially phosphonomethylated polymer with 44 mol % $CH_2PO_3H_2$ functional group.

EXAMPLE 7

To 80 g of the unpurified, alkaline solution of the partially phosphonomethylated polymer from Example 6 was added 17.4 g of monohydrated sodium 2-chloroethanesulfonate. After the solution was heated to reflux for 24 hours, the polymer was purified by ultrafiltration and lyophilization, giving 9.0 g yellowish powder.

The structure of this material was verified by elemental analysis, $^1$H and $^{31}$P NMR as phosphonated/sulfonated polymer with 44 mol % $CH_2PO_3H_2$ and 36 mol % $CH_2CH_2SO_3H$ functional groups. The $\overline{M}w$ and $\overline{M}n$ determined by GPC were 14,400 and 6,300, respectively.

EXAMPLE 8

To a solution of 40.0 g of PAA.HCl commercially available from Nitto Boseki Co. as PAA.HCl-3S and 200 g concentrated hydrochloric acid were added 37.0 g phosphorous acid and 70.0 g formalin. The solution was heated to reflux for 10 hours. After reflux, the excess HCl was removed by evaporation under reduced pressure and the resulting solution was treated with aqueous sodium hydroxide to be 400 g and pH 12. 100 g of this solution was ultrafiltered and lyophilized to give 14.3 g off-white powder.

$^1$H and $^{31}$P NMR measurements indicated a partially phosphonomethylated polymer with 40 mol % $CH_2PO_3H_2$ functional group.

EXAMPLE 9

To 300 g of the unpurified, alkaline solution of the partially phosphonomethylated polymer from Example 8 was slowly added 60.7 g of chloroacetic acid. The solution was adjusted to pH=12 with sodium carbonate and then heated to reflux for 24 hours. After reaction, the polymer was purified by ultrafiltration followed by concentration to give 200 g of an aqueous solution having 28.0% solid content by weight.

The $^1$H and $^{31}$P NMR measurements indicated that this polymer was comprised of 40 mol % $CH_2PO_3H_2$ and 56 mol % $CH_2COOH$ functional groups. GPC measurement showed $\overline{M}w$ and $\overline{M}n$ of 51,400 and 28,300, respectively.

EXAMPLE 10

To a solution of 9.0 g of PAA.HCl, commercially available from Nitto Boseki Co. as PAA.HCl-3S, and 40 g concentrated hydrochloric acid were added 9.4 g phosphorous acid and 15.6 g formalin. The solution was heated to reflux for 5 hours under stirring. After reflux, the excess HCl was removed by evaporation under reduced pressure and the resulting solution was treated with aqueous sodium hydroxide to be 120 g and pH≈12. 40 g of this solution was ultrafiltered and lyophilized to give 3.3 g off-white powder.

$^1$H and $^{31}$P NMR measurements indicated a partially phosphonomethylated polymer with 41 mol % $CH_2PO_3H_2$ functional group.

EXAMPLE 11

To 80 g of the unpurified, alkaline solution of the partially phosphonomethylated polymer from Example 10 were added 3.8 g chloroacetic acid and 7.5 g monohydrated sodium 2-chloroethanesulfonate. The solution was readjusted to pH≈12 with sodium hydroxide and then heated to reflux for 18 hours. After reaction, the polymer was purified by dialysis and isolated by lyophilization, giving 7.9 g yellowish powder.

Elemental analysis, $^1$H and $^{31}$P NMR measurements indicated 41 mol % $CH_2PO_3H_2$, 42 mol % $CH_2COOH$ and 7 mol % $CH_2CH_2SO_3H_3$ functional groups in the polymer. GPC measurement showed $\overline{M}w$ and $\overline{M}n$ of 45,000 and 27,500, respectively.

EXAMPLE 12

An acidic solution of P(AA.HCl) was prepared from 50.4 g of hydrochlorinated allylamine in the same manner as described in Example 1, except that 3.0 g of 2,2'-azobis(2-amidinopropane) dihydrochloride and 4.0 g of isopropanol were used. After polymerization, the excess HCl was evaporated off under reduced pressure and the solution was neutralized with aqueous sodium hydroxide to pH 12.0, yielding 400.0 g of polymer solution.

EXAMPLE 13

To 100.0 g of the alkaline polymer solution from Example 12 were added 20.4 g of chloroacetic acid and 10.0 g of monohydrated sodium chloroethanesulfonate. After the solution was heated to reflux for 4 hours, the pH was adjusted to 12.0 with sodium hydroxide. A mixture of 4.1 g chloroacetic acid and 2.0 g monohydrated sodium chloroethanesulfonate was added to the solution and the reaction was then continued for another 20 hours under reflux conditions. The resulting polymer was purified by ultrafiltration and lyophilization, yielding 22.1 g yellowish powder.

Elemental analysis and $^1$H NMR measurement indicated 46 mol % $CH_2COOH$, and 14 mol % $CH_2CH_2SO_3H$ functional groups in the polymer. GPC measurement showed $\overline{M}w$ and $\overline{M}n$ of 13,100 and 6,100, respectively.

EXAMPLE 14

Using the same procedure as described in Example 13, 112.0 g of the polymer solution from Example 12 was reacted with 20.0 g of chloroacetic acid and 16.7 g of monohydrated sodium chloroethanesulfonate, followed by a mixture of 4.0 g chloroacetic acid and 3.4 g monohydrated sodium chloroethanesulfonate. After purification, 24.3 g of yellowish powder was obtained.

Elemental analysis and $^1$H NMR measurement indicated 37 mol % $CH_2COOH$ and 20 mol % $CH_2CH_2SO_3H$ functional groups in the polymer. GPC measurement showed $\overline{M}w$ and $\overline{M}n$ of 12,800 and 6,000, respectively.

EXAMPLE 15

Using the same procedure as described in Example 13, 100.0 g of the polymer solution from Example 12 was reacted with 15.3 g of chloroacetic acid and 19.9 g of monohydrated sodium chloroethanesulfonate, followed by a mixture of 3.1 g chloroacetic acid and 4.0 g monohydrated sodium chloroethanesulfonate. After purification, 23.0 g of yellowish powder was obtained.

Elemental analysis and $^1$H NMR measurement indicated 52 mol % $CH_2COOH$, and 24 mol % $CH_2CH_2SO_3H$ functional groups in the polymer. GPC measurement showed $\overline{M}w$ and $\overline{M}n$ of 12,100 and 5,800, respectively.

EXAMPLE 16

To a solution of 5.0 g of P(AA.HCl), commercially available from Nitto Boseki Co. as PAA.HCl-3S, and 60 g of deionized water was added 24.7 g of monohydrated sodium 2-chloroethanesulfonate. The solution was adjusted to pH≈13 with aqueous sodium hydroxide and then heated to reflux for 24 hours under stirring. After reaction, the solution was dialyzed against water via a 3,000 molecular weight cut off membrane, concentrated, and finally freeze-dried to give 9.8 g of yellowish powder.

$^1$H NMR measurement indicated an ethylenesulfonated product with 58 mol % $CH_2CH_2SO_3H$ functional group. GPC measurement showed $\overline{M}w$ and $\overline{M}n$ of 38,800 and 17,300, respectively.

EXAMPLES 17–26

These examples demonstrate the effectiveness of N-functionalized polyallylamines as a threshold inhibitor of calcium carbonate scale. The following test procedure was undertaken for this evaluation. Sample solutions were prepared in varying concentrations of polymers, as shown in Table I, and were added to a test solution containing 1000 ppm of calcium and 1200 ppm of bicarbonate when expressed as calcium carbonate. The pH of the solution was adjusted to 8.55 and was then oscillated for 18 hours at 50° C. The solution was allowed to cool to room temperature and a 20 ml aliquot was withdrawn and filtered through a 0.1 μm Milipore membrane. The filtrate was then acidified to pH≈3 with diluted nitric acid. The amount of calcium remaining in solution was determined by inductively coupled plasma atomic emission spectroscopy. The % threshold inhibition was calculated as follows:

$$\% \text{ Inhibition} = \frac{\text{ppm } Ca^{++} (\text{treated}) - \text{ppm } Ca^{++} (\text{control})}{\text{ppm } Ca^{++} (\text{initial}) - \text{ppm } Ca^{++} (\text{control})} \times 100$$

The results are shown in Table I, wherein Examples 23–26 are included for comparative purposes.

The data in Table I demonstrate that these N-functionalized polyallylamines are effective threshold inhibitors of calcium carbonate scale.

TABLE I

| EXAMPLE NO. | POLYMER | % INHIBITION 5 ppm | % INHIBITION 10 ppm |
|---|---|---|---|
| 17 | From Example 3 | 30 | 45 |
| 18 | From Example 5 |  | 46 |
| 19 | From Example 7 | 33 | 49 |
| 20 | From Example 13 | 56 | 61 |
| 21 | From Example 14 | 58 | 59 |
| 22 | From Example 15 | 52 | 51 |
| 23 | P(AA—PO$_3$H$_2$)$^{(1)}$ | 6 | 15 |
| 24 | P(AA—COOH)$^{(2)}$ | 11 | 12 |
| 25 | P (MAA)$^{(3)}$ |  | 22 |
| 26 | P (MAA—AMPS)$^{(4)}$ | 26 | 19 |

$^{(1)}$P(AA—PO$_3$H$_2$): phosphonomethylated polyallylamine having 95 mol % $CH_2PO_3H_2$.
$^{(2)}$P(AA—COOH): carboxymethylated polyallylamine having 97 mol % $CH_2COOH$.
$^{(3)}$P (MAA): poly(methacrylic acid), 4,200 molecular weight.
$^{(4)}$P (MAA—AMPS): copolymer of methacrylic acid with 2-acrylamido-2-methyl-1-propanesulfonic acid (1:1 ratio), 22,000 molecular weight.

EXAMPLES 27–36

These examples indicate a synergistic effect between N-functionalized polyallylamine and low molecular weight phosphonate compounds on the threshold inhibition of calcium carbonate scale. The test was performed according to the procedure described in example I, except that 0.26 ppm or 0.50 ppm of 1-hydroxyethylidene-1,1-diphosphonic acid (HEDPA) was added to the test water. The data, as shown in Table II, indicate that the scale inhibition of N-functionalized polyallylamines is clearly synergised by small amounts of phosphonates.

TABLE II

| EXAMPLE NO. | POLYMER | % INHIBITION Polymer/HEDPA 5.0/0.26$^{(1)}$ | Dosage 5.0/0.5$^{(2)}$ | (ppm/ppm) 10.0/0 |
|---|---|---|---|---|
| 27 | From Example 3 | 52 | 64 | 45 |
| 28 | From Example 5 | 43 | 53 | 46 |
| 29 | From Example 7 | 41 | 59 | 49 |
| 30 | From Example 13 | 61 | 67 | 61 |
| 31 | From Example 14 | 59 | 72 | 65 |
| 32 | From Example 15 | 51 | 55 | 60 |
| 33 | P(AA—PO$_3$H$_2$)$^{(3)}$ | 25 | 32 | 15 |
| 34 | P(AA-COOH)$^{(4)}$ | 10 | 37 | 12 |
| 35 | P (MAA)$^{(5)}$ | 27 | 47 | 22 |
| 36 | P (MAA—AMPS)$^{(6)}$ | 21 | 22 | 19 |

$^{(1)}$0.26 ppm HEDPA showed 2% inhibition.
$^{(2)}$0.50 ppm HEDPA showed 44% inhibition.
$^{(3)}$P(AA—PO$_3$H$_3$): phosphonomethylated polyallylamine having 95 mol % $CH_2PO_3H_2$.
$^{(4)}$P(AA—COOH): carboxymethylated polyallylamine having 97 mol % $CH_2COOH$.
$^{(5)}$P(MAA): poly(methacrylic acid), 4,200 molecular weight.
$^{(6)}$P (MAA—AMPS): copolymer of methacrylic acid with 2-acrylamido-2-methyl-1-propanesulfonic acid (1:1 ratio), 22,000 molecular weight.

EXAMPLES 37–46

One of the methods of evaluating activity of a material for treating aqueous systems consists of measuring its ability to disperse particulate matters which are normally found in such systems. These examples demonstrate the effectiveness of the N-functionalized polyallylamines as dispersing agents. The following test procedure was undertaken for this evaluation. A 500 ml. solution was made up with 450 ml. deionized distilled water already adjusted to pH≈11 with NaOH, 10 ml. of 1208 ppm $FeCl_3.6H_2O$, a desired amount of polymer, 10 ml. of 3098 ppm $NaHCO_3$, 10 ml. of 1183 ppm $Na_2SiO_3.9H_2O$, 10 ml. of 1233 ppm $MgSO_4.7H_2O$ and 10 ml. of 2205 ppm $CaCl_2.2H_2O$. The pH was readjusted to 11.0 with NaOH. This solution was heated to reflux vigorously for 3 hours. Thereafter, the solution was transferred into a graduated cylinder while hot and was allowed to settle for 23 hours at room temperature. An aliquot was then withdrawn from the cylinder at specific depth and acidified to pH≈3. The remaining iron and magnesium in the solution were analyzed by inductively coupled plasma atomic emission spectroscopy. The percentages of dispersion were calculated as follows:

$$\% \text{ Fe dispersion} = \frac{\text{ppm Fe (treated)} - \text{ppm Fe (control)}}{\text{ppm Fe (initial)} - \text{ppm Fe (control)}} \times 100$$

$$\% \text{ Mg dispersion} = \frac{\text{ppm Mg (treated)} - \text{ppm Mg (control)}}{\text{ppm Mg (initial)} - \text{ppm Mg (control)}} \times 100$$

The results are summarized in Table III.

TABLE III

| EXAMPLE | | % DISPERSION | |
|---|---|---|---|
| NO. | POLYMER (6 ppm) | Fe | Mg |
| 37 | From Example 3 | 57 | 55 |
| 38 | From Example 5 | 42 | 45 |
| 39 | From Example 7 | 34 | 40 |
| 40 | From Example 13 | 33 | 38 |
| 41 | From Example 14 | 36 | 40 |
| 42 | From Example 15 | 31 | 35 |
| 43 | P(AA—$PO_3H_2$)[1] | 3 | 11 |
| 44 | P(AA—COOH)[2] | 12 | 15 |
| 45 | P (MAA)[3] | 20 | 23 |
| 46 | P (MA—AS)[4] | 16 | 24 |

[1] P(AA—$PO_3H_2$): phosphonomethylated polyallylamine having 95 mol % $CH_2PO_3H_2$.
[2] P(AA—COOH): carboxymethylated polyallylamine having 97 mol % $CH_2COOH$.
[3] P (MAA) = poly(methacrylic acid), 4,200 molecular weight.
[4] P (MA—AS): copolymer of maleic acid and allylsulfonic acid (1:1 ratio), 2,300 molecular weight.

I claim:

1. A water-soluble, N-functionalized polyallylamine N-oxide having recurring units represented by the formula:

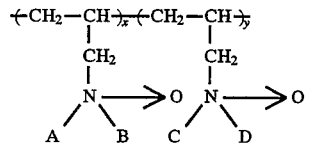

wherein A, B, C and D are independently selected from the group consisting of hydrogen, $CH_2PO_3H_2$, $(CH_2)_n COOH$, $(CH_2)_m SO_3H$ and water-soluble salts thereof, wherein n=1 to 4, m=1 to 4, x is 1 to 99 mol %, y is 1 to 99 mol % and x+y=100.

2. The water-soluble N-functionalized polyallylamine N-oxide according to claim 1 wherein A is $CH_2PO_3H_2$ and at least one of B, C or D is $(CH_2)_m SO_3H$ in a relative proportion of 90:10 to 40:60 mole % respectively.

3. The water-soluble N-functionalized polyallylamine N-oxide according to claim 1 wherein A is $(CH_2)_n COOH$ and at least one of B, C or D is $(CH_2)_m SO_3H$ in a relative proportion of 90:10 to 50:50 mol % respectively.

4. The water-soluble N-functionalized polyallylamine N-oxide according to claim 1 wherein the polyallylamine contains $CH_2PO_3H_2$, $(CH_2)_n COOH$ and $(CH_3)_m SO_3H$ functional groups in a relative portion of $CH_2PO_3H_2$: $(CH_2)_n COOH:(CH_2)_m SO_3H$ in the range 40:40:20 to 20:20:40 mol % respectively.

5. The water-soluble N-functionalized polyallylamine N-oxide according to claim 1 wherein the $(CH_2)_m SO_3H$ functional group is ethanesulfonate.

6. The water-soluble N-functionalized polyallylamine N-oxide according to claim 1 wherein the $(CH_2)_n COOH$ functional group is acetic acid.

* * * * *